Patented Jan. 5, 1932

1,839,733

UNITED STATES PATENT OFFICE

JULIEN BERGÉ, OF TIRLEMONT, BELGIUM, ASSIGNOR TO RAFFINERIE TIRLEMONTOISE, SOCIÉTÉ ANONYME, OF TIRLEMONT, BELGIUM, A CORPORATION

CENTRIFUGAL METHOD FOR TREATING SCUMS OF ALL KINDS

No Drawing. Application filed February 24, 1928, Serial No. 256,816, and in Germany May 12, 1927.

As it is well-known, in the sugar refineries a saturation scum is obtained in the purification of the juice by means of lime and carbonic acid, which scum is composed of precipitated carbonate of lime and purified sugar juice. To obtain the latter, the scum is pressed in filter presses, but it is impossible to obtain the entire juice contained therein by a simple pressing process. On the contrary, about 50 per cent of the juice remains in the pressed scum. Therefore, after the filter press has been filled, the scum cakes formed are washed with water. Due to unequal deposition of the scum or to the formation of cracks in the cake the washing operation does not take place in the required uniform manner, but some portions of the cake are washed too much, whereby non-sugar substances are dissolved therefrom, which mix with the juice and contaminate it, or insufficiently washed cake portions cause losses of juice.

The scum that has been washed still possesses a water content of about 50 per cent and therefore cannot without further treatment be used as a fertilizer and must moreover under circumstances be stored or seasoned several years before it can be used.

Saccharate scums of lime, baryta, strontia, etc., are produced in desugaring syrups of lower purity, or molasses. For instance, the lime-saccharate contains the pure sugar of the molasses, combined with the lime, while the non-sugar substances of the molasses are found in the so-called waste liquor. The separation of the lime saccharate from the waste liquor is effected likewise by means of filter presses. To separate as thoroughly as possible the waste liquor from the lime saccharate it is in this case also necesary, to wash out the saccharate cakes formed in the filter press, which operation is likewise incomplete due to the unequal cake formation. The cake portions which are washed out incompletely cause a decrease of the purity of the saccharate due to waste liquor remaining therein, and excessively washed-out portions cause a loss of sugar, due to sugar being dissolved from the saccharate and entering the waste liquor. The washed saccharate likewise still contains about 60 percent of water. In the further treatment of the saccharate to obtain the sugar this water enters the sugar juice and dilutes it in an undesirable manner.

Now the method according to the invention resides in the fact, that the saturation scum and the scum of the different saccharates are separated from the sugar juice and the waste liquor, instead of by means of a filter press, by subjecting them to the action of centrifuges. This method is carried out under such a high centrifugal force, that the same high desugaring of the saturation scum or even a higher one and a corresponding high purity of the saccharate is obtained by a simple centrifugal process, but without a subsequent washing operation, as when treated in filter presses. This is due substantially to the fact, that by this treatment every particle of the sugar juice and of the waste liquor is subjected to the action of the centrifugal force and has therefore the tendency to uniformly escape from all portions of the scum, independently of the nature of the latter, and that this separating action takes place down to a remainder of juice of about 20 to 15 per cent and less. An example relating to saturation scum is as follows:

As experience shows, 100 kgs. of treated beet-roots result in about 11 per cent of saturation scum containing 50 per cent of liquid, that is, with unwashed scum a content of juice of 50 per cent. The juice contains about 13 per cent of sugar. When the treatment by centrifugal-action is carried out down to a content of juice of 15 per cent, then the following calculation results:

100 kgs. beet-roots result in 11 kgs. of scum containing 50 per cent of liquid=5.5 kgs. of dry scum, or 100 kgs. of beet-roots result in 6.5 kgs. of scum containing 84.62 per cent of dry substance=5.5 kgs. of dry scum and 1 kg. of juice.

1 kg. of juice of 13 per cent of sugar contains 0.13 kg. of sugar, therefore the loss of sugar amounts to 0.13 per cent with relation to the quantity of beet-roots treated. This is a percentage of loss that is contained only in the exceptional cases in the treatment by filter presses and subsequent washing operation; as a rule, the losses are higher, e. g. 0.15 to 0.2 per cent and more depending the more or less upon the carefulness with which the washing operation is performed.

Quite similar conditions prevail in treating the saccharate, as the following calculation proves:

As saccharate scum contains 60 per cent of waste liquor and the dry saccharate contains 50 per cent of sugar, and, as experience shows, the liquor contains 5 per cent of non-sugar substances.

100 kgs. of saccharate scum consist of 3 kgs. of non-sugar substances, and 57 kgs. of water = 60 per cent of waste liquor, and of 20 kgs. of sugar and 20 kgs. of lime = 40 per cent of dry saccharate.

After centrifuging down to a waste liquor content of 15 per cent, the following composition is obtained:

47.1 kgs. of saccharate comprising 0.36 kg. of non-sugar substances 6.74 kgs. of water = 15 per cent of waste liquor, and 20 kgs. of sugar and 20 kgs. of lime = 85 per cent of dry saccharate.

When further treated (finish saturation with carbonic acid) sugar and non-sugar substances are dissolved. The juice then contains 20 kgs. of sugar and 0.36 kg. of non-sugar substances or 20.36 kgs. of impure sugar. The content of the juice of pure sugar is therefore $$\frac{20 \times 100}{20.36} = 98.2 \text{ per cent.}$$

As experience proves, in the old treatment by pressing through filters a purity of only 93 to 96 per cent is obtained according to the care with which the washing operation is carried out.

There is no doubt, therefore, that by the treatment by centrifugal action with a high centrifugal force better results are obtained than with the hitherto used pressing through filter and subsequent washing operation, and that the new method entirely obviates the drawbacks of the washing process, viz. high consumption of water and dilution of the juice and of the saccharate by the washing water.

The saturation lime obtained by the centrifugal action contains about 15 per cent of water and is so dry and of such a uniform nature, as to be able to immediately be taken from the centrifuge and filled into bags and at once used as fertilizer.

My tests have proved that, according to the more or less slimy nature of the scum or saccharate a centrifugal force of the 1500- to 6000-fold and more of the weight of the quantity to be centrifuged is required to obtain the desired result, while the hitherto usual centrifuges exert a centrifugal force of at best the 800-fold of that weight.

Reference is made to the file of my co-pending application S. N. 167,598, (patented September 9, 1930, No. 1,775,385), in which the use of high centrifugal forces in sugar processes is discussed in detail.

I claim:

1. A process for removing liquid matter from scum obtained in the manufacture of sugar, comprising centrifuging said scum at a centrifugal force sufficiently in excess of 800 times the weight of the charge to obtain a mass of a substantially dry and uniform nature.

2. A process for removing liquid matter from scum obtained in the manufacture of sugar, comprising centrifuging said scum at a centrifugal force in excess of 800 times the weight of the charge to reduce said liquid matter in said scum to at least as low as 20%.

3. A process for separating sugar juice from saturation scum, which comprises centrifuging said scum at a centrifugal force in excess of 800 times the weight of the charge to obtain a scum of a dry and uniform nature adapted for immediate use as a fertilizer.

4. A process for separating sugar juice from saturation scum, which comprises centrifuging said scum at a centrifugal force sufficiently in excess of 800 times the weight of the charge to reduce the sugar juice content of the mass to at least as low as 20% without washing.

5. A process for separating waste liquor from saccharate scum, which comprises centrifuging said scum at a centrifugal force sufficiently in excess of 800 times the weight of the charge to reduce the waste liquor content of the mass to at least as low as 20% without washing.

In testimony whereof I have affixed my signature.

JULIEN BERGÉ.